HYDRAULIC CUSHION
Original Filed May 8, 1963 5 Sheets-Sheet 1
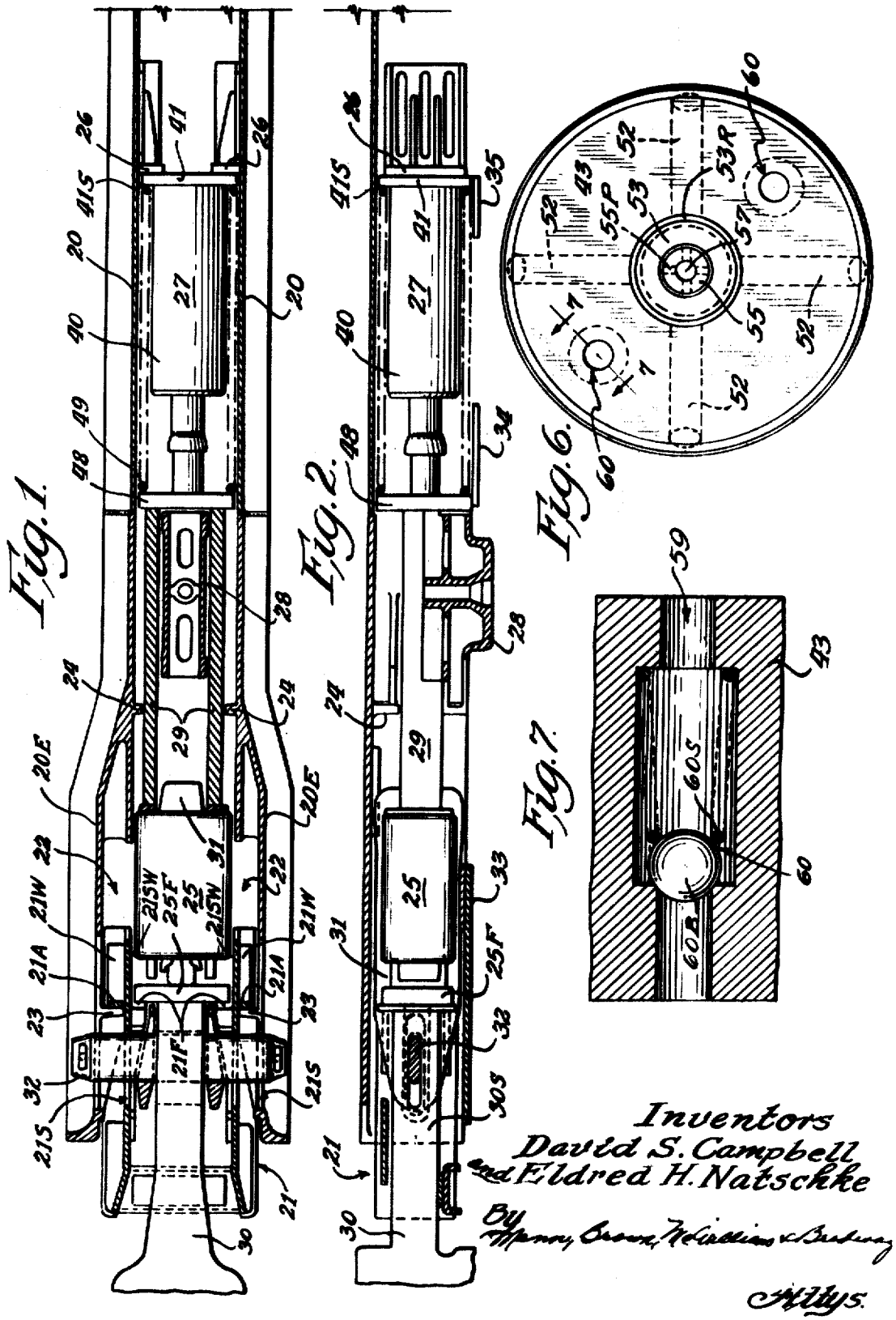
Inventors
David S. Campbell
and Eldred H. Natschke
By
Attys.

HYDRAULIC CUSHION

Original Filed May 8, 1963 5 Sheets-Sheet 2

Inventors
David S. Campbell
and Eldred H. Nutschke
By Mason, Brown, McCullough & Bradway
Attys.

HYDRAULIC CUSHION

Original Filed May 8, 1963 5 Sheets-Sheet 3

Inventors
David S. Campbell
and Fildred H. Natschke
By
Mann, Brown, McWilliams & Bradway
Attys.

HYDRAULIC CUSHION

Original Filed May 8, 1963 5 Sheets-Sheet 4

Inventors
David S. Campbell
and Eldred H. Natschke
By Mason, Brown, McWilliams & Bradway
Attys

HYDRAULIC CUSHION

Original Filed May 8, 1963 5 Sheets-Sheet 5

Inventors
David S. Campbell
and Eldred H. Natschke
By Mann, Brown, McWilliams & Bradway
Attys.

United States Patent Office

Re. 27,159
Reissued Aug. 10, 1971

27,159
HYDRAULIC CUSHION

David S. Campbell, Glen Ellyn, and Eldred H. Natschke, Bourbonnais, Ill., assignors to Cardwell Westinghouse Company

Original No. 3,150,783, dated Sept. 29, 1964, Ser. No. 278,952, May 8, 1963, which is a continuation-in-part of Ser. No. 220,323, Aug. 29, 1962. Application for reissue Sept. 8, 1969, Ser. No. 862,990

Int. Cl. B61g *9/16, 11/12*

U.S. Cl. 213—43 21 Claims

Matter enclosed in heavy brackets [ ] appears in the original patent but forms no part of this reissue specification; matter printed in italics indicates the additions made by reissue.

*ABSTRACT OF THE DISCLOSURE*

*A hydraulic cushion for railroad cars including a hydraulic cylinder having a ram actuated piston reciprocally mounted therein in which the piston is equipped with a variable orifice responsive to instantaneous pressures on the high pressure side of the piston in the form of a spring loaded orifice pin that meters the flow of hydraulic fluid between the high and low pressure sides of the piston in cushioning impacts. A pressure relief valve is also included in the piston to protect against overloads.*

This invention relates to a hydraulic cushion and more particularly to a hydraulic cushion of the fluid throttling type for developing reaction and energy dissipation in accordance with the characteristics of the impacting bodies between which the cushion acts.

This application is a continuation-in-part of our pending application Serial No. 220,323, filed August 29, 1962, now Patent No. 3,150,782, granted September 29, 1964, which discloses a hydraulic cushioning element utilized in a draft gear for achieving high capacity and a controlled response in accordance with the nature of the closure stroke of the gear.

The present application discloses an improvement on the hydraulic cushioning element and illustrates the element applied as a separate cushion. A tandem draft rigging arrangement is shown herein incorporating an improved hydraulic cushioning element in accordance with this invention. It will become apparent that the hydraulic cushioning element has numerous other applications where high energy dissipation is desirable.

The principal object of the present invention is to provide a hydraulic cushioning element having an orifice arrangement variable automatically in size and flow resistance in accordance with the pressures acting thereat.

Another object of the invention is the provision of a hydraulic cushioning element having a spring loaded floating pin cooperatively defining an orifice configuration and controlling changes therein in accordance with pressures acting upon the pin to oppose the spring bias applied thereto.

Still another object of the invention is the provision of a compound variable orifice having a main floating pin controlling a main orifice configuration in accordance with pressures acting thereat and having a supplementary floating pin controlling a supplementary orifice in accordance with pressures acting thereat.

A further object of the invention is the provision of a compound variable orifice arrangement having a main orifice controlled by a stiff floating pin in close clearance relation to achieve rapid pressure build-up upon initial impact, and having a supplementary floating pin controlling a supplementary orifice and developing a soft action to minimize initial shock effects that tend to be produced by the close clearance stiff pin control at the main orifice.

Other objects and advantages of the invention will become apparent during the course of the following description.

In the accompanying drawings forming a part of this specification and in which like numerals are employed to designate like parts throughout the same:

FIG. 1 is a horizontal section through familiar parts of a draft rigging arrangement for a railway car;

FIG. 2 is a vertical section of the same;

FIG. 6 is a face view of the piston of FIG. 4 and is taken as indicated at 6—6 of FIG. 4;

FIG. 7 is a fragmentary sectional view taken on the line 7—7 of FIG. 6;

Figure 3:
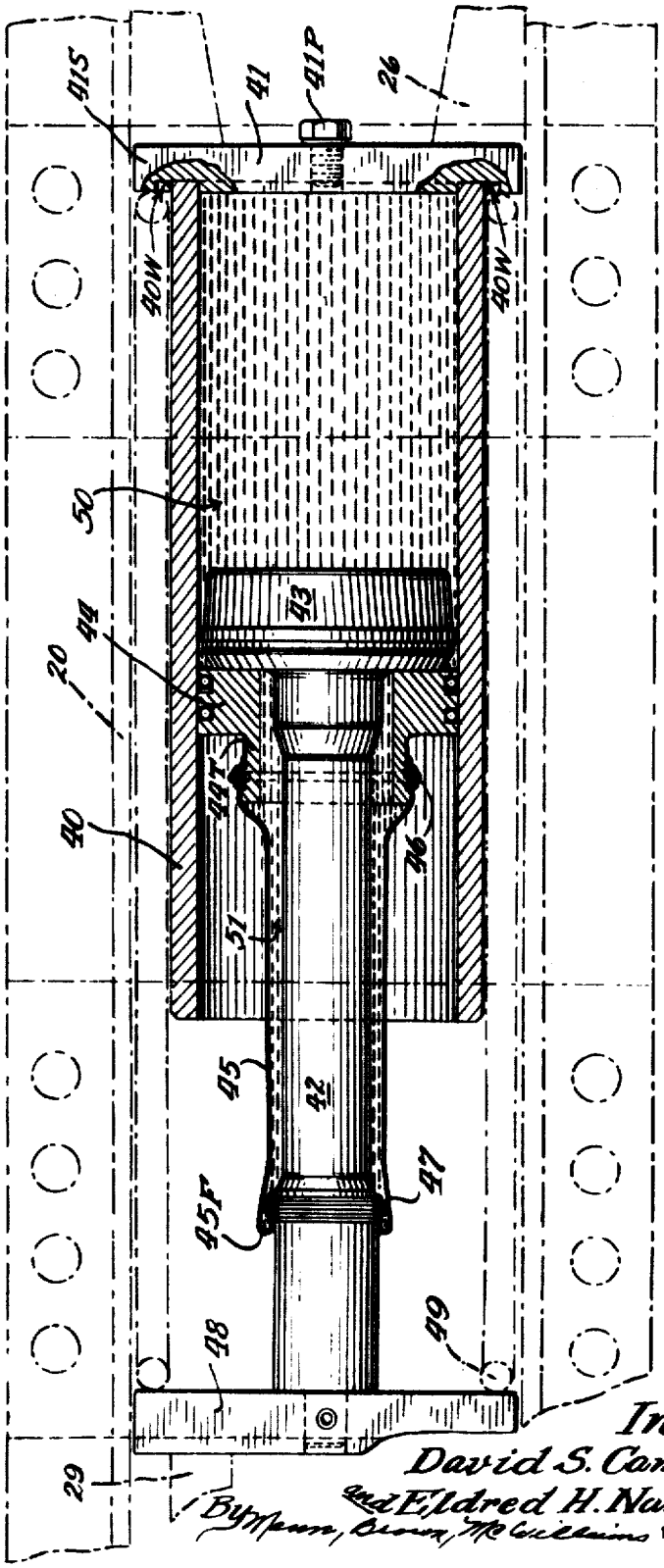
FIG. 3 is a lengthwise section through the hydraulic cushioning element.

An important application of this invention is shown by way of illustrative disclosure in FIGS. 1 and 2, in which there appears a draft rigging arrangement for one end of a railway car. While the other end of the car is not shown, it should be understood that it will be similarly equipped. The tandem rigging arrangement as shown herein, includes center sills 20 spaced apart in the usual fashion along most of their length and flared laterally at their ends 20E as indicated in FIG. 1 to provide central mounting clearance for a slidable stub sill 21. The stub sill 21 is of a generally hollow box-like configuration and has guide wing structure 21W projecting laterally from opposite sides thereof adjacent its inner end. The center sill end portions 20E have internal wall configurations defining elongated guide pockets 22 in which the guide wing structures 21W are lengthwise slidable. The center sill end portions 20E are equipped adjacent their outer ends with rigid front stops 23 and adjacent their inner ends with rigid over-solid abutments 24.

The center sill end portions 20E define a mounting pocket for an outer cushioning unit 25 and the main center sills 20 are equipped with rigid rear stops 26 defining a mounting pocket for an inner cushioning unit 27. A bolster center filler 28 is shown fixed to the center sills 20 and is arranged to provide a pair of longitudinally extending passages in which thrust bars 29 are slidable for transmitting buff forces from the outer cushioning element 25 to the inner cushioning element 27 to enable both elements to act in cushioning buff loads. The combined travel thus afforded is greater than that provided in conventional draft rigging and requires that the coupler 30 have its head spaced outwardly of the car end a corresponding amount. To provide effective support for the outwardly offset coupler 30 the stub sill 21 projects outwardly of the car end and is slidable inwardly during buff travel to accommodate the full coupler travel. Accordingly, the stub sill 21 has supplemental front stops 21F rigid thereon and movable therewith, and has rigid abutments 21A externally on its side walls 21SW. A vertical yoke 31 is connected to the shank 30S of the coupler by a draft key 32 that also projects through slots 21S in the side walls of the stub sill and through longer slots 20S in the side walls of the center sill and portions 20E. The yoke 31 encircles the outer cushioning unit 25 and serves to apply draft forces thereto, with the inner cushioning unit 27 not being active under draft load conditions.

The parts are shown in the position they assume when the draft rigging is in full release. In this position the outer cushioning unit 25, which is here represented as a draft gear of the friction clutch type, is shown holding its front follower 25F against the front stops 21F of the stub sill 21, which, in turn, has its abutments 21A engaging the front stops 23 on the center sill end portions 20E. A single carrier iron 33 is shown tied between the center sill end portions 20E and underlies both the stub sill 21 and the outer cushioning unit 25, and a pair of carrier irons 34 and 35 are shown tied between the main center sills 20 to underlie opposite ends of the inner cushioning unit 27.

Buff forces are applied through the coupler shank 30S to the front follower 25F and then through the front draft gear 25, which is movable rearwardly as a unit to transmit the buff forces through the thrust bars 29 and into the inner cushioning unit 27 which reacts against the rear stops 26. Over-solid loads are relieved by engagement of the rear end of the outer cushioning unit 25 with the over-solid abutments 24 prior to full closure of the inner cushioning unit 27. Upon release, the inner cushioning unit 27 must return the outer unit 25 and stub sill 21 to their initial positions.

In accordance with this invention, the inner cushioning unit is of a self-restoring hydraulic fluid throttling type, and as best shown in FIG. 3, includes a cylinder sleeve 40 sealed at its inner or rear end by a rectangualr cap end 41 that may have a removable fill plug 41P threadedly engaged therein. While the cylinder sleeve 40 and the end cap 41 are represented as separate parts secured as by welding at 40W, they may be formed as integral parts of a one-piece structure. A ram 42 extends into the cylinder sleeve through its outer end and carries a piston 43 that is lengthwise reciprocably operable within the cylinder sleeve 40.

A ring-shaped cylinder cap 44 is shown fixed within the cylinder sleeve in peripheral sealing engagement therewith and includes an outwardly projecting integral tubular end projection 44T. An elongated sleeve-shaped seal boot 45 encircles the ram 42 and at one end is mounted in sealed relation upon the tubular projection 44T of the cylinder cap 44 by means of a band clamp 46, and at the other end has a reverse fold 45F sealed upon an enlarged section of the ram 42 by means of a band clamp 47. At its extreme outer end the ram 42 is affixed to a transverse follower plate 48 and a return spring 49 encircles the cylinder sleeve 40 and reacts between the follower plate 48 and a peripheral shoulder 41S on the cylinder end cap to urge these elements apart.

A variable volume high pressure chamber 50 is defined within the cylinder 40 in the space between the end cap 41 and the piston 43, and a variable volume low pressure chamber 51 is defined in the space between the boot 45, the ram 42, and the ring-shaped cylinder cap 44.

During closure of the hydraulic element such as is occasioned by a buff impact in the application illustrated herein, the follower ram 42 and piston 43 move inwardly towards the cylinder end cap 41 and cause displacement of hydraulic fluid from the high pressure chamber 50 to the low pressure chamber 51 by flow through a passage extending through the piston and establishing communication between these chambers. The loss of volume within the cylinder 40 occasioned by inward travel of the ram 42 is accommodated by expansion of the low pressure chamber 51 occasioned by changes in the contour of the boot 45.

Upon release the parts of this hydraulic cushion are restored by the action of the return spring 49 which, in addition, must be strong enough to restore the thrust bars 29, the friction gear 25, and the associated rigging to their original release position.

Details of the piston arrangement and flow passage configuration of a presently preferred embodiment of a hydraulic cushion are best seen in FIGS. 4 to 7. The piston 43, as illustrated, is integral with the ram 42 and is provided with an axial bore 43B of progressively inwardly stepped configuration opening centrally through its high pressure face 43H. The passage from the low pressure chamber 51 to the high pressure chamber 50 through the piston 43 is completed by a set of four branches 52 radiating obliquely from the bore 43B at a location adjacent its open end. The branches 52 open through relieved corner regions at the low pressure side of the piston 43. The open end of the piston bore 43B is equipped with elements for defining an orifice configuration that is variable in accordance with the instantaneous pressure conditions existing in the high pressure chamber 50.

The provision of a pressure responsive variable orifice for the hydraulic cushioning element enables it to develop greater effective capacity and to adapt automatically as required by the characteristics of the load to which it is subjected. At the time a load is initially applied, it is important that the orifice opening be of minimum size to enable it to offer maximum resistance to flow, and effect a rapid build-up of reaction force. By this means, the energy dissipation provided by the gear may start more quickly and at a higher level, thereby acting over a longer travel distance and providing greater effective capacity.

The pressure developed in the high pressure chamber 50 is essentially dependent upon the closure velocity. Since this pressure determines the initial *reaction* [reaciton] offered by the cushion 27, and since the cushion's reaction determines the *deceleration* [deceleraiton] in accordance with the masses acting in the system, the velocity at various stages of closure is dependent on both the initial velocity and the masses that are involved.

Figure 4:
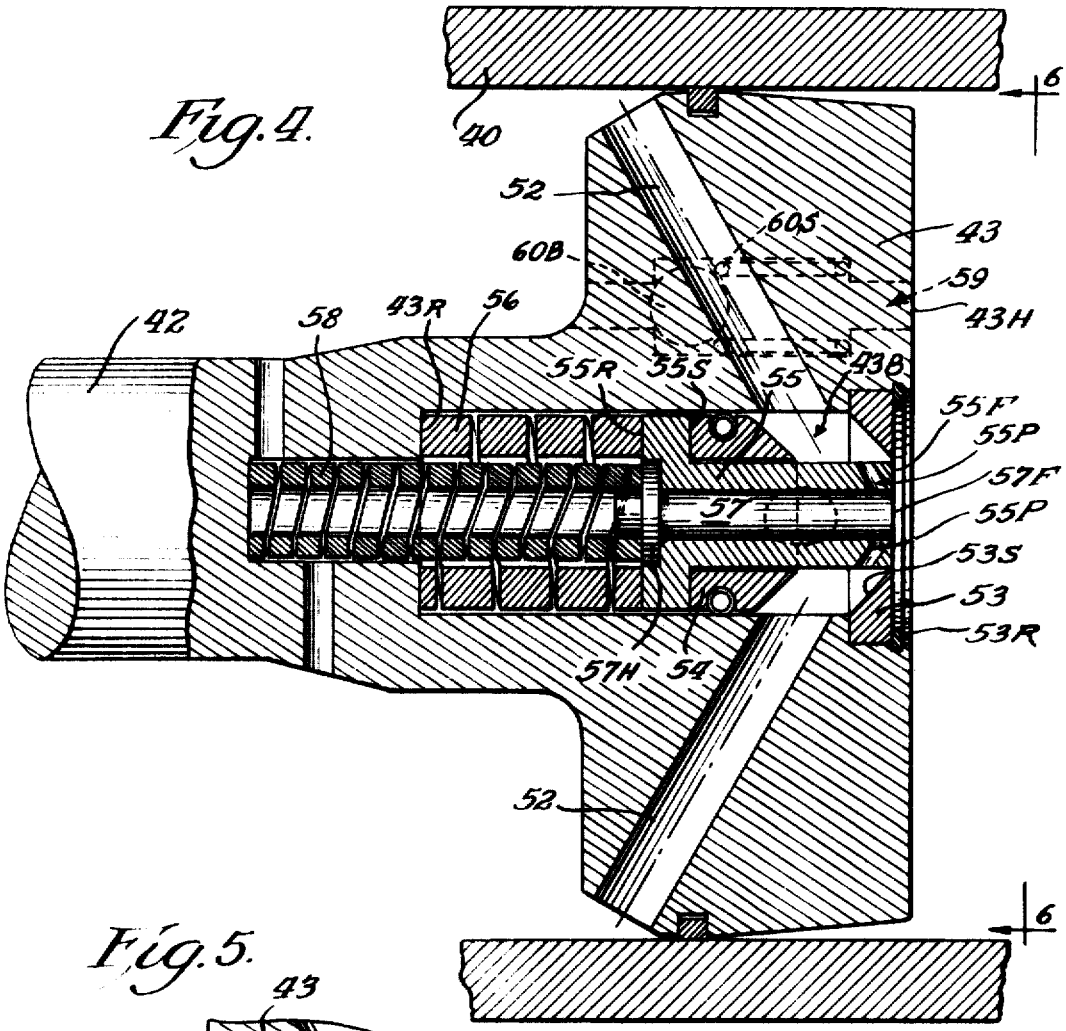
FIG. 4 is an enlarged lengthwise sectional view through the piston and cylinder region of the hydraulic cushioning element.

In the preferred arrangement illustrated in FIG. 4, the extreme outer end of the piston bore is bordered by an internal axial shoulder to define a seat for an orifice insert ring 53 that is locked in place by a suitable retainer ring 53R.

The orifice ring 53 presents a knife-blade orifice edge and has an orifice surface 53S of a configuration to present an orifice passage that flares in a direction leading into the piston bore 43B. An intermediate bearing insert 54 is fixed within the piston bore at a location inwardly of the branches 52 and presents an annular abutment surface facing a corresponding shoulder 55S provided on a T-shaped orifice pin 55. The bearing insert 54 guides sliding movement of the orifice pin 55 which projects through the bore 43B towards the orifice ring 53 and terminates in an end face 55F substantially filling the opening through the orifice ring 53 and exposed directly to pressure conditions in the high pressure chamber.

A coil-type load spring 56 of substantial strength is nested within the intermediate length region of the bore 43B to react between an intermediate seat 43R therein and the shoulder 55R provided on the orifice pin 55. This load spring 56 is under predetermined initial compression and normally maintains the orifice pin 55 in its full forward position as determined by the bearing insert 54 and as illustraetd in FIG. 4. This establishes the level of the initial force acting to hold the orifice opening at a minimum size until pressure in the high pressure chamber 50 reaches a predetermined value related to the strength of the load spring 56 and the exposed area on the face 55F of the orifice pin 55.

An important feature of this invention is the achievement of a compound variable orifice action and for this purpose a center pin 57 is slidable in an axial throughbore of the main orifice pin 55 and is normally held in the position illustrated in FIG. 4 by a load spring 58 that nests within the reduced innermost region of the piston bore. The center pin 57 has an enlarged head 57H arranged in countersunk relation in the rear of the main orifice pin 55 and having abutting engagement therewith to determine the maximum projection of its outer end face 57F at a location flush with the end face 55F and approximately at the plane of the knife edge of the orifice ring 53. The head 57H on the center pin 57 functions as a seat for its load spring 58.

In general, the load spring 58 for the center pin 57 is substantially weaker than the load spring 56 for the main orifice pin 55, and while the center pin 57 has less face area exposed to pressure in the high pressure chamber 50, the strength of the load spring 58 and the extent of precompression thereof is selected so that the center pin 57 has a substantially softer action, that is, it will retract at a pressure value substantially less than that to which the main orifice pin initially responds.

As is best seen in FIGS. 6 and 7, the piston 43 is provided with return flow passages 59 equipped with ball check return flow valve facilities 60, each including a ball valve 60B and a load spring 60S to limit pressure build-up in the low pressure chamber 51 during the return stroke of the cushion and also to facilitate more rapid release of the unit. While no pressure relief flow passages are illustrated in the piston disclosed [herein] *in FIGS. 1–10 hereof*, it should be understood that relief facilities of the type shown in FIG. 5 of our pending application, Serial No. 220,323 (*see FIG. 11 hereof*) may be incorporated to limit the pressure in the high pressure cylinder 50 to some preselected maximum permissible value.

*As disclosed in said application (see FIG. 11 hereof), a pair of pressure relief flow passages 127 lead through the piston 106 to connect the high pressure and low pressure chambers 118 and 119 of said application Ser. No. 220,323. A relief valve assembly 128 is provided in each passage 127 and is arranged to open if pressure within the high pressure chamber 118 of the cylinder sleeve 102 exceeds some preselected value. Each relief valve assembly 128, that is shown herein for purposes of illustrative disclosure, includes a chambered valve body 129 threadedly mounted in its passage and having a central inlet port 129P leading to side outlets 129S and then through side channels 129C opening into the low pressure chamber. A needle valve 130 is disposed in the valve body and is resiliently seated in the inlet port 129P by the action of a spring 131 which is controlled by an adjusting screw 132 threaded in the rear of valve body. Relief valves of other forms may also be employed, if desired.*

For a hydraulic cushion to operate efficiently, it is important that it set up high flow resistance as rapidly as possible upon impact. For this purpose, the initial orifice size should be a minimum and, therefore, the main orifice pin 55 projects centrally into the orifice ring insert 53 in extremely close fit relation, for example, in the arrangement illustrated in FIG. 4, an annular dimension of about 1/32 of an inch is provided between the outer periphery of the main pin 55 and the inner periphery of the insert ring 53. Since the main pin 55 is loaded by an extremely strong spring 56, it will have no tendency to deflect until significant pressure values build up in the high pressure chamber 50. This may tend to make the initial response of the cushion too sharp and result in excessive pressure build-up causing an overshoot of the pressure beyond that for which the gear is designed. The main pin 55 must, however, have a strong load spring 56 if it is to exert a control over the orifice configuration at high values of reaction force. Thus, the center pin 57 is given a softer action and normally masks supplemental flow ports 55P provided in the side walls of the main pin 55 at locations adjacent the end face 55F. Upon retraction of the center pin 57, limited flow is permitted through the ports 55P and the branches 52 to minimize the tendency for high peaked shock effects, such as are normally associated with rapid build-up of pressure in a hydraulic cushion. It is preferred, however, that the center pin 57 be preloaded sufficiently to encourage a substantial initial pressure build-up before it retracts.

Figure 5:
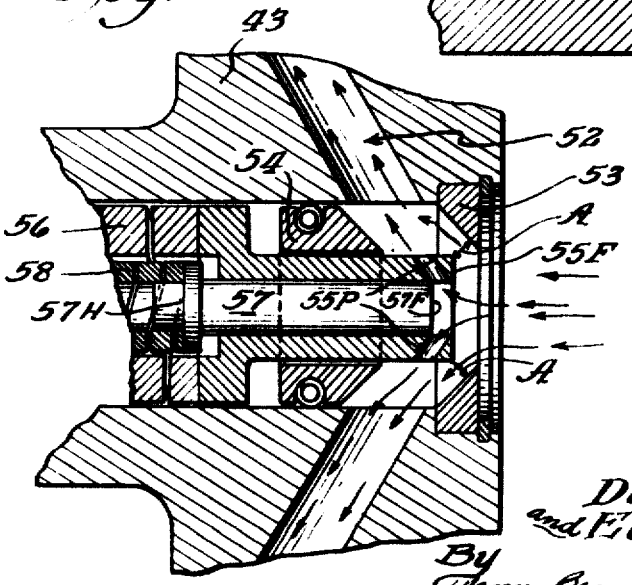
FIG. 5 is a fragmentary detailed view corresponding to that of FIG. 4 and showing the parts in changed position.

The compound pin arrangement has an additional advantage in that it increases the maximum effective area at the orifice at full deflection. The effective size of the orifice passage existing between the insert ring 53 and the main orifice pin 55, as illustrated in FIG. 5, is equal to the area of the frustum region designated at "A" in FIG. 5, and for the illustrated orifice configuration this area is somewhat less than the area of the opening defined by the insert ring. In this instance, the center pin 57 and the supplemental ports 55P that it uncovers add to the maximum effective area available at the orifice and this increases the range of orifice size variation without, however, increasing the desired minimum initial orifice size.

In a presently preferred embodiment, the orifice ring insert has a diameter of 1⅛", the main pin 55 has a diameter of 1 1/16", providing an annular clearance of 1/32" between the insert 53 and the pin 55, and the center pin 57 has a diameter of ½".

Force deflection characteristics for the main pin load spring 56 and the center pin load spring 58 are given in the following table:

| Deflection in inches | Spring 56 (pounds) | Spring 58 (pounds) |
|---|---|---|
| Initial precompression | 1,285 | 275 |
| 1/16 | 1,530 | 302 |
| 1/8 | 1,775 | 330 |
| 3/16 | 2,015 | 357 |
| 1/4 | 2,260 | 385 |
| 5/16 | 2,450 | 410 |
| 3/8 | | 440 |
| 7/16 | | 470 |
| 1/2 | | 505 |

For these orifice, pin and spring characteristics and an effective piston face diameter of 8½", the pin action at various pressure levels in the high pressure chamber 50 is as follows:

| Pressure in p.s.i. in chamber 50 | Inches deflection of pin 55 | Inches deflection of pin 57 |
|---|---|---|
| 500 | 0 | 0. |
| 1,000 | 0 | 0. |
| 1,500 | 0 | 1/32. |
| 2,000 | 1/32 | 17/64. |
| 2,500 | 3/32 | 7/16, goes solid at ½. |
| 3,000 | 19/64 | Solid. |
| 3,500 | 19/64, goes solid at 5/16 | Do. |
| 4,000 | Solid | Do. |

To some extent the shaping of the orifice defined between the insert ring 53 and the main pin 55 and the provision of a load spring for the main pin with greater total deflection can also be used for increasing the range of orifice size variation but this will not as effectively control the initial pressure build-up.

Figure 8:
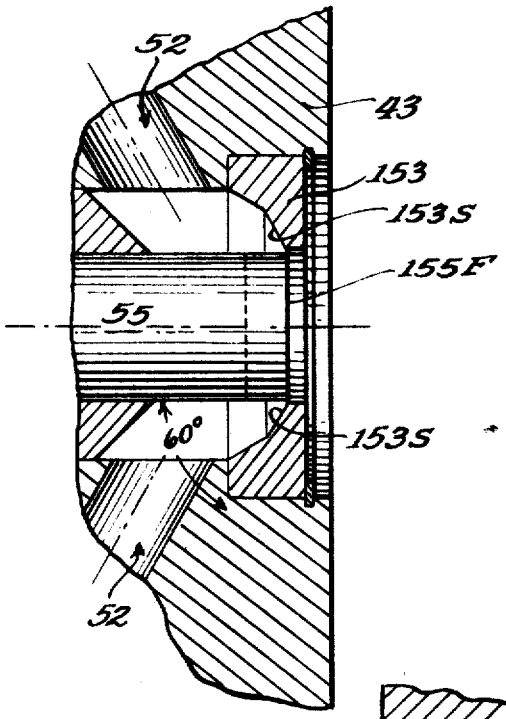
FIG. 8 is a fragmentary sectional view corresponding to that of FIG. 5 and illustrating an alternative orifice arrangement.
Figure 9:
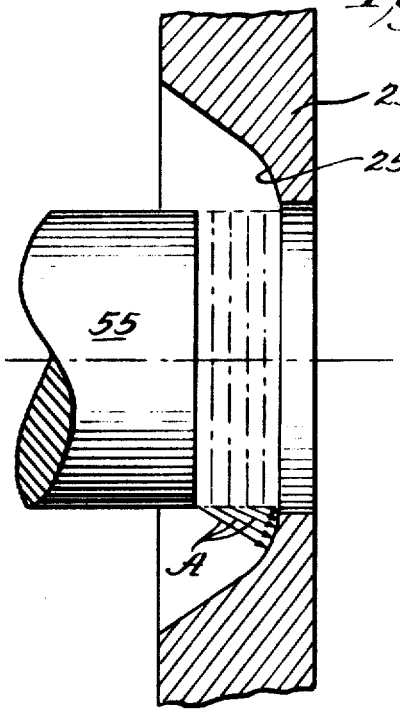
FIGS. 9 and 10 are fragmentary sectional views corresponding to that of FIG. 5 and illustrating alternative contoured orifice configurations [.]; *and*
Figure 10:
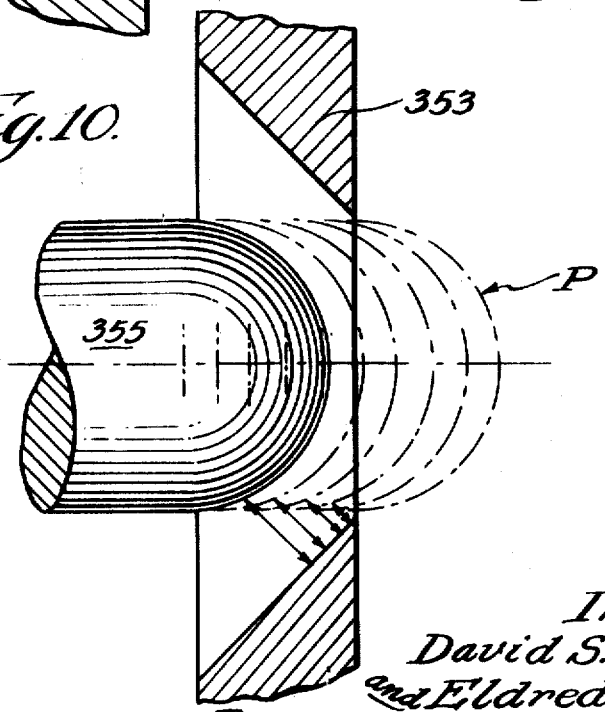
Figure 11:
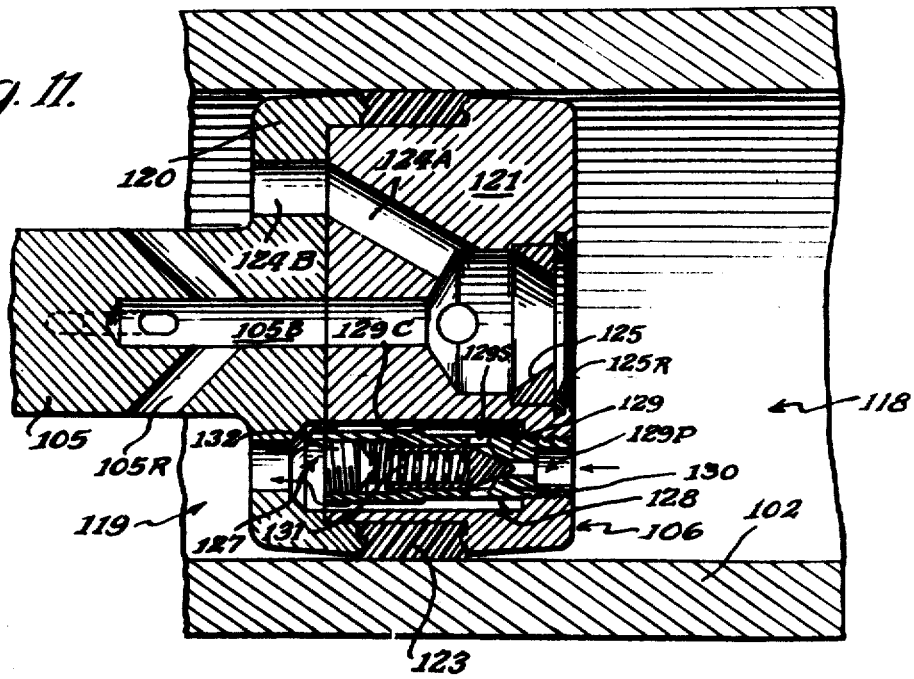
*FIG. 11 is FIG. 5 of our said application Serial No. 220,323 showing the relief valve of said application Serial No. 220,323 that is referred to hereinafter.*

Various arrangements for the orifice contour defined between the main floating pin and the orifice ring element are shown in FIGS. 8, 9 and 10, with each of these arrangements providing an orifice configuration that increases in area with progressive deflection of the pin. In the arrangement of FIG. 8 the orifice ring 153 has a more sharply angled surface 153S adjacent its mouth and cooperates with the pin 55 here shown diagrammatically with its end face 155F of right circular configuration. In FIG. 9 an orifice ring 253 having a smoothly curved orifice surface 253S is shown and the series of arrows A illustrate the progressive increases in orifice area. Finally, in FIG. 10 a pin 355 of hemispherical end face configuration and having a normal position indicated by the phantom line P is employed with a conical orifice ring 353 to provide an orifice opening having an area that increases rapidly with pin deflection.

With the arrangements shown in FIGS. 8, 9 and 10, the full orifice opening capacity can be developed without requiring unduly large pin deflections. The compound variable orifice feature is still importantly useful with these contoured orifice arrangements in order to permit the main orifice pin to establish a minimum clearance at its normal position without, however, creating excessive shock on the initial pressure build-up as this is minimized by the action of the center pin which is arranged to act at lower pressure values and increase the initial orifice opening when some selected lower pressure value is exceeded.

With reference to any of the orifice arrangements disclosed herein, it is possible to achieve more rapid pressure build-up by reducing the clearance between the main pin and the orifice ring to substantially zero and such an arrangement is particularly feasible with the compound orifice feature which acts to control sharp pressure peaks against overshoot.

*The pressure responsive variable orifice arrangements herein disclosed comprise pressure sensitive value arrangements that provide the desired gear closure reaction characteristic without requiring programmed metering of the type that is involved in cushioning devices using tapered pins, grooves and the like for metering fluid flow. Since the orifice control of our invention is regulated by the instantaneous pressures on the high pressure side of the piston, it will be seen that the gear closure control resulting therefrom is based on what is happening during the course of the particular impact involved, rather than having to rely on a fixed metering program that is designed for certain assumed impact conditions.*

While preferred embodiments of the invention are illustrated herein, it is to be understood that changes and variations may be made by those skilled in the art without departing from the spirit and scope of the appended claims.

[The embodiments of the invention in which an exclusive property or privilege is claimed are defined as follows:]

*We claim:*

1. In a hydraulic cushioning element having relatively movable means providing a high pressure chamber, a low pressure chamber and a passage extending therebetween, means in said passage providing a flow restricting orifice at an end thereof exposed directly to said high pressure chamber, a pin disposed in lengthwise slidable relation in said passage and having a free end facing through said orifice and exposed directly to pressure conditions in said high pressure chamber, resiliently yieldable means acting against said pin with predetermined initial force to bias said pin towards said high pressure chamber to an orifice narrowing position and establish a minimum initial orifice opening and enable retraction of the pin and corresponding opening of the orifice when pressure in the high pressure chamber increases beyond a predetermined value determined by said initial force, said pin having an axial bore through said free end and having a side bore adjacent said free end and communicating directly between said axial bore and said passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force.

2. In a hydraulic cushioning element having relatively movable means providing a high pressure chamber, a low pressure chamber and a passage extending therebetween, means in said passage providing a flow restricting orifice at an end thereof exposed directly to said high pressure chamber, a pin disposed in lengthwise slidable relation in said passage and having a free end facing through said orifice and exposed directly to pressure conditions in said high pressure chamber, resiliently yieldable means acting against said pin with predetermined initial force to bias said pin towards said high pressure chamber to an orifice narrowing position and establish a minimum initial orifice opening and enable retraction of the pin and corresponding opening of the orifice when pressure in the high pressure chamber increases beyond a predetermined value determined by said initial force, said pin having an axial bore through said free end and having a side bore adjacent said free end and communicating directly between said axial bore and said passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force, the last named predetermined value of pressure being substantially less than the first named predetermined value of pressure to enable retraction of said center pin and uncovering of said side bore in advance of retraction of said first named pin.

3. In a hydraulic cushioning element having relatively movable means providing a high pressure chamber, a low pressure chamber and a passage extending therebetween, means in said passage providing a flow restricting orifice at an end thereof exposed directly to said high pressure chamber, a pin disposed in lengthwise slidable relation in said passage and having a free end facing through said orifice and exposed directly to pressure conditions in said high pressure chamber, resiliently yieldable means acting against said pin with predetermined initial force to bias said pin towards said high pressure chamber to an orifice narrowing position and establish a minimum initial orifice opening and enable retraction of the pin and corresponding opening of the orifice when pressure in the high pressure chamber increases beyond a predetermined value determined by said initial force, said pin and said orifice having cooperating surfaces providing an annular orifice therebetween having a configuration that progressively increases in size upon retraction of said pin, said pin having an axial bore through said free end and having a side bore adjacent said free end and communicating directly between said axial bore and said passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force, the last-named predetermined value of pressure being substantially less than the first named predetermined value of pressure to enable retraction of said center pin and uncovering of said side bore in advance of retraction of said first named pin.

4. In a hydraulic cushioning element having relatively movable means providing a high pressure chamber, a low pressure chamber and a passage extending therebetween, means in said passage providing a flow restricting orifice at an end thereof exposed directly to said high pressure chamber, a pin disposed in lengthwise slidable relation in said passage and having a free end facing through said orifice and exposed directly to pressure conditions in said high pressure chamber, resiliently yieldable means acting against said pin with predetermined initial force to bias said pin towards said high pressure chamber to an orifice narrowing position and establish a minimum initial orifice opening and enable retraction of the pin and corresponding opening of the orifice when pressure in the high pressure chamber increases beyond a predetermined value determined by said initial force, said pin having a central passageway communicating with an intermediate region of said passage and having one end opening through said free end, a center pin disposed in lengthwise slidable relation in said first pin for substantially sealing said passageway against flow therethrough and having a free end facing through said orifice and exposed directly to pressure conditions in said high pressure chamber, resiliently yieldable means in said passageway and acting against said center pin with predetermined initial force to bias said center pin towards said high pressure chamber to a passageway sealing position and enable retraction of said center pin to open said passageway when pressure in the high pressure chamber increases beyond a predetermined value determined by the last named initial force.

5. In a hydraulic cushioning element having means including a cylinder, a ram, and a piston fixed on the ram and slidable lengthwise within the cylinder to define high pressure and low pressure chambers on opposite sides of the piston, said piston having a passage therethrough establishing communication between said chambers, means in said passage providing a flow restricting orifice exposed directly to said high pressure chamber and having an orifice configuration that flares in a passage direction leading away from the high pressure chamber, a pin disposed in lengthwise slidable relation in said piston and having a free end projecting along said passage to face through said orifice and be exposed to pressure conditions in said high pressure chamber, resiliently yieldable means in said piston and acting against said pin with predetermined initial force to bias said pin towards said high pressure chamber to an orifice narrowing position and establish a minimum initial orifice opening to enable retraction of the pin and corresponding opening of the orifice when pressure in the high pressure chamber increases beyond a predetermined value determined by said initial force, said pin having an axial bore through said free end and having a side bore adjacent said free end and communicating directly between said axial bore and said passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force.

6. In a hydraulic cushioning element having means including a cylinder, a ram, and a piston fixed on the ram and slidable lengthwise within the cylinder to define high pressure and low pressure chambers on opposite sides of the piston, said piston having a passage therethrough establishing communication between said chambers, means in said passage providing a flow restricting orifice exposed directly to said high pressure chamber and having an orifice configuration that flares in a passage direction leading away from the high pressure chamber, a pin disposed in lengthwise slidable relation in said piston and having a free end projecting along said passage to face through said orifice and be exposed to pressure conditions in said high pressure chamber, resiliently yieldable means in said piston and acting against said pin with predetermined initial force to bias said pin towards said high pressure chamber to an orifice narrowing position and establish a minimum initial orifice opening to enable retraction of the pin and corresponding opening of the orifice when pressure in the high pressure chamber increases beyond a predetermined value determined by said initial force, said pin having an axial bore through said free end and having a side bore adjacent said free end and communicating directly between said axial bore and said passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force, the last named predetermined value of pressure being substantially less than the first named predetermined value of pressure to enable retraction of said center pin and uncovering of said side bore in advance of retraction of said first named pin.

7. In a hydraulic cushioning element having means including a cylinder, a ram, and including a piston fixed on the ram and slidable lengthwise within the cylinder to define high pressure and low pressure chambers on opposite sides of the piston, said piston having a passage therethrough establishing communication between said chambers, means in said passage providing a flow restricting orifice exposed directly to said high pressure chamber and having an orifice configuration that flares in a passage direction leading away from the high pressure chamber, a pin disposed in lengthwise slidable relation in said piston and having a free end projecting along said passage to face through said orifice and be exposed to pressure conditions in said high pressure chamber, resiliently yieldable means in said piston and acting against said pin with predetermined initial force to bias said pin towards said high pressure chamber to an orifice narrowing position and establish a minimum initial orifice opening to enable retraction of the pin and corresponding opening of the orifice when pressure in the high pressure chamber increases beyond a predetermined value determined by said initial force, said pin having a central passageway communicating with an intermediate region of said passage and having one end opening through said free end, a center pin disposed in lengthwise slidable relation in said first pin for substantially sealing said passageway against flow therethrough and having a free end facing through said orifice and exposed directly to pressure conditions in said high pressure chamber, resiliently yieldable means in said piston and acting against said center pin with predetermined initial force to bias said center pin towards said high pressure chamber to a pasageway sealing position and enable retraction of said center pin to open said passageway when pressure in the high pressure chamber increases beyond a predetermined value determined by the last named initial force.

8. In a hydraulic cushioning element having means including a cylinder, a ram, and a piston fixed on the ram and slidable lengthwise in the cylinder to define high pressure and low pressure chambers on opposite sides of the piston, said piston having a passage extending therethrough to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperative surfaces providing an annular orifice therebetween having a configuration that progressively increases in size upon inward shifting movement of said one element and a load spring carried in said piston and projecting along said passage to act with predetermined initial force upon said one element and hold said one element towards said high pressure chamber to establish a minimum size orifice initially, with said load spring being yieldable to allow retraction of said one element into said passage and corresponding expansion of the orifice when pressure in the high pressure chamber increases beyond a predetermined value determined by the initial force of said spring and the effective transverse area of said one element, said pin element having an axial bore through said free end and having a side bore adjacent said free end and communicating directly between said axial bore and said passage, a center pin disposed in lengthwise slidable relation in said axial bore and having a free end facing through said orifice and exposed directly to pressure conditions in said high pressure chamber, resiliently yieldable means in and axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force.

9. In a hydraulic cushioning element having means including a cylinder, a ram, and a piston fixed on the ram and slidable lengthwise in the cylinder to define high pressure and low pressure chambers on opposite sides of the piston, said piston having a passage extending therethrough to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperative surfaces providing an annular orifice therebetween having a configuration that progressively increases in size upon inward shifting movement of said one element and a load spring carried in said piston and projecting along said passage to act with predetermined initial force upon said one element and hold said one element towards said high pressure chamber to establish a minimum size orifice initially, with said load spring being yieldable to allow retraction of said one element into said passage and corresponding expansion of the orifice when pressure in the high pressure chamber increases beyond a predetermined value determined by the initial force of said spring and the effective transverse area of said one element, said pin element having an axial bore through said free end and having a side bore adjacent said free end and communicating directly between said axial bore and passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force, the last named predetermined value of pressure being substantially less than the first named predetermined value of pressure to enable retraction of said center pin and uncovering of said side bore in advance of retraction of said shiftable one of said elements.

10. In a hydraulic cushioning element having means including a cylinder, a ram, and a piston fixed on the ram and slidable lengthwise in the cylinder to define high pressure and low pressure chambers on opposite sides of the piston, said piston having a passage extending therethrough to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperating surfaces providing an annular orifice therebetween having a configuration that progressively increases in size upon inward shifting movement of said one element and a load spring carried in said piston and projecting along said passage to act with predetermined initial force upon said one element and hold said one element towards said high pressure chamber to establish a minimum size orifice initially, with said load spring being yieldable to allow retraction of said one element into said passage and correspinding expansion of the orifice when pressure in the high pressure chamber increases beyond a predetermined value determined by the initial force of said spring and the effective transverse area of said one element, said pin element having a central passageway communicating with an intermediate region of said passage and having one end opening through the said free end, a center pin disposed in lengthwise slidable relation in said fist pin for substantially sealing said passageway against flow therethrough and having a free end facing through said orifice and exposed directly to pressure conditions in said high pressure chamber, resiliently yieldable means in said piston and acting against said center pin with predetermined initial force to bias said center pin towards said high pressure chamber to a passageway sealing position and enable retraction of said center pin to open said passageway when pressure in the high pressure chamber increases beyond a predetermined value determined by the last named initial force.

11. In a hydraulic cushioning element having means including a cylinder, a ram, and a piston fixed on the ram and slidable lengthwise in the cylinder to define high pressure and low pressure chambers on opposite sides of the piston, means completing a flow passage through said piston establishing communication between said chambers and comprising first and second flow restricting orifices exposed to said high pressure chamber, a first pin disposed in lengthwise slidable relation in said piston and having a free end facing through said first orifice and exposed directly to pressure conditions in said high pressure chamber, resiliently yieldable means in said piston and acting against said first pin with predetermined initial force to bias said first pin towards said high pressure chamber to a position where it substantially closes said first orifice to enable retraction of said pin and corresponding opening of said first orifice when pressure in the high pressure chamber increases beyond a predetermined value determined by said initial force, said pin and said orifice having cooperating surfaces providing an annular orifice therebetween having a configuration that progressively increases in size upon retraction of said pin, a second pin disposed in lengthwise slidable relation in said piston and having a free end facing through said second orifice and exposed directly to pressure conditions in said high pressure chamber, resiliently yielding means in said piston and acting against said second pin with predetermined initial force to bias said second pin towards said high pressure chamber to an orifice narrowing position and establish a minimum initial orifice opening to enable retraction of said second pin and corresponding opening of said second orifice when pressure in the high pressure chamber increases beyond a predetermined value determined by said last named initial force, the last-named predetermined value of pressure being substantially less than the first named predetermined value of pressure to enable retraction of said second pin and opening of said second orifice in advance of retraction of said first pin.

12. In a hydraulic cushioning element having means including a cylinder, a ram, and a piston fixed on the ram and slidable lengthwise in the cylinder to define high pressure and low pressure chambers on opposite sides of the piston, means completing a flow passage through said piston establishing communication between said chambers and comprising first and second flow restricting orifices exposed to said high pressure chamber, said last means including a ring element in said piston in an end of said passage that is directly exposed to said high pressure chamber, a first pin element disposed in lengthwise slidable relation in said piston and having a free end centered in said ring element and facing said high pressure chamber, one of said elements being mounted for lengthwise shifting movement into said passage and said elements having cooperative surfaces providing an annular orifice therebetween having a configuration that progressively increases in size upon inward shifting movement of said one element and a load spring carried in said piston and acting with predetermined initial force upon said one element to hold said one element towards said high pressure chamber and establish a minimum size orifice initially, with said load spring being yieldable to allow retraction of said one element into said passage and corresponding expansion of the orifice when pressure in the high pressure chamber increases beyond a predetermined value determined by the initial force of said spring and the effective transverse area of said one element, a second pin disposed in lengthwise slidable relation in said piston and having a free end facing through said second orifice and exposed directly to pressure conditions in said high pressure chamber, resiliently yielding means in said piston and acting against said second pin with predetermined initial force to bias said second pin towards said high pressure chamber to an orifice narrowing position and establish a minimum initial orifice opening to enable retraction of said second pin and corresponding opening of said second orifice when pressure in the high pressure chamber increases beyond a predetermined value determined by said last named initial force and the effective transverse area of said second pin, the last named predetermined value of pressure being substantially less than the first named predetermined value of pressure to enable retraction of said second pin and opening of said second orifice in advance of opening of said first orifice.

13. In a hydraulic cushioning element having means including a cylinder, a ram, and a piston fixed on the ram and slidable lengthwise within the cylinder to define high pressure and low pressure chambers on opposite sides of the piston, said piston having an axial bore opening into said high pressure chamber and having a stepped cross-sectional configuration providing an outer region of greatest diameter and bordered by an axially directed internal seat of corresponding diameter, an intermediate region of intermediate diameter and bordered by an axially directed seat and in inner region of smallest diameter and bordered by an axially directed seat, said piston having a passage therethrough leading from the low pressure chamber into an outer region of the intermediate region of the said axial bore and then through said bore to establish communication between said chambers, an orifice insert ring fixed in said bore to abut against the seat bordering said outer region of the bore, said insert ring providing a flow restricting orifice exposed directly to said high pressure chamber and having an orifice configuration that flares in a passage direction leading into said piston bore, and annular bearing insert fixed in said bore in said intermediate region thereof, a pin of T-shaped lengthwise cross-section configuration disposed in lengthwise slidable relation in said bearing insert and having a head inwardly of said bearing insert to engage and be retained thereby and having a free end projecting through said bearing insert to face through said orifice and be exposed to pressure conditions in said high pressure chamber, a load spring reacting between the seat that borders said intermediate region and said pin head and exerting predetermined initial force to bias said pin towards said high pressure chamber to an orifice narrowing position and establish a minimum initial orifice opening to enable retraction of the pin and corresponding opening of the orifice when pressure in the high pressure chamber increases beyond a predetermined value determined by said initial force, said pin having an axial throughbore having a side bore adjacent said free end and communicating directly between said axial bore and said intermediate region of said piston bore, a center pin disposed in lengthwise slidable relation in said axial bore and having an enlarged head on its inner end in retained engagement with the head of the first-named pin, and having a free end facing through said orifice and exposed directly to pressure conditions in said high pressure chamber, and a load spring in the inner region of said piston bore and reacting between the seat bordering the same and the enlarged head of said center pin to apply predetermined initial force to bias said center pin towards said high pressure chamber to a side bore masking position and enable retraction of said center pin and corresponding uncovering of said side bore when pressure in the high pressure chamber increases beyond a predetermined value determined by the last named initial force.

14. In a hydraulic cushioning element including a cylinder, *hydraulic fluid in the cylinder,* a ram, a piston fixed on said ram and slidable lengthwise in the cylinder to define high pressure and low pressure chambers *for the fluid* on opposite sides of the piston, *pressure regulating means associated with the piston for controlling pressure within the high pressure chamber in response to movement of said piston toward cushion closure position, said pressure regulating means including* a passage extending through said piston to establish communication between said chambers, said passage having a flow restricting orifice at one end exposed directly to said high pressure chamber, a pin disposed in lengthwise slidable relation in said piston and having a free end facing said high pressure chamber, resilient means normally projecting said pin towards the orifice to narrow the effective size of the orifice and to allow increase in effective size of the orifice by retraction of the pin when pressure increases in the high pressure chamber, *said pressure regulating means being operable at pressures below approximately 4,000 p.s.i. to restrictively control the flow of fluid from the high pressure side of the piston to the other side thereof.*

15. In a hydraulic cushioning element including a cylinder, *hydraulic fluid in the cylinder,* a ram relatively lengthwise slidable in the cylinder and defining, in conjunction with the cylinder, a variable volume high pressure fluid chamber, means engaged between the ram and cylinder to sealingly connect the same in relatively slidable relation and to define cooperatively therewith a low pressure fluid chamber, *pressure regulating means associated in the ram for controlling pressure within the high pressure chamber in response to movement of said ram toward cushion closure position, said pressure regulating means including* means providing a passage leading between said chambers and having an orifice adjacent the high pressure chamber and having an orifice configuration that flares in a direction leading into the passage, a shiftable pin disposed in said passage and having a free end of smaller transverse area than said orifice and located at said orifice for direct exposure to pressure conditions in said high pressure chamber, a load spring carried in said ram and acting with predetermined initial force upon said pin to move said pin towards said orifice to establish a minimum orifice opening and to allow increase in the effective size of the orifice by retraction of the pin when pressure in the high pressure chamber increases beyond a predetermined value determined by the initial force of said spring and the effective transverse area of said pin, *said pressure regulating means being operable at pressures below approximately 4,000 p.s.i. to restrictively control the flow of fluid from the high pressure side of the piston to the other side thereof.*

16. In a hydraulic cushioning element including a cylinder, *hydraulic fluid in the cylinder,* a ram, a piston fixed on the ram and slidable lengthwise in the cylinder to define in conjunction with the cylinder and ram high pressure and low pressure chambers *for the fluid* on opposite sides of the piston, *pressure regulating means associated with the piston for controlling pressure within the high pressure chamber in response to movement of said piston toward cushion closure position, said pressure regulating means including* said piston having a passage extending therethrough to establish communication between said chambers, means providing an orifice in said passage located directly at said high pressure chamber and having an orifice configuration that flares in a direction leading into the passage, a shiftable pin disposed in said passage and having a free end of smaller transverse area than said orifice and located at said orifice for direct exposure to pressure conditions in said high pressure chamber, a load spring carried in said ram and acting with predetermined initial force upon said pin to move said pin towards said orifice to establish a minimum orifice opening and to allow increase in the effective size of the orifice by retraction of the pin when pressure in the high pressure chamber increases beyond a predetermined value determined by the initial force of said spring and the effective transverse area of said pin, *said pressure regulating means being operable at pressures below approximately 4,000 p.s.i. to restrictively control the flow of fluid from the high pressure side of the piston to the other side thereof.*

17. In a hydraulic cushioning element including a cylinder, *hydraulic fluid in the cylinder,* a ram, a piston fixed on said ram and slidable lengthwise in the cylinder to define high pressure and low pressure chambers *for the fluid* on opposite sides of the piston, *pressure regulating means associated with the piston for controlling pressure within the high pressure chamber in response to movement of said piston toward cushion closure position, said pressure regulating means including* a passage extending through said piston to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperating surfaces providing an annular orifice therebetween having a configuration that progressively increases in size upon inward shifting movement of said one element and resilient means in said piston projecting along said passage and abutting said one element to yieldably hold said one element towards the high pressure chamber and allow retraction of said one element and increased opening of said orifice when pressure increases in said high pressure chamber, *said pressure regulating means being operable at pressures below approximately 4,000 p.s.i. to restrictively control the flow of fluid from the high pressure side of the piston to the other side thereof.*

18. In a hydraulic cushioning element including a cylinder, *hydraulic fluid in the cylinder,* a ram, a piston fixed on the ram and slidable lengthwise in the cylinder to define high pressure and low pressure chambers *for the fluid* on the opposite sides of the piston, *pressure regulating means associated with the piston for controlling pressure within the high pressure chamber in response to movement of said piston toward cushion closure position, said pressure regulating means including* said piston having a passage extending therethrough to establish communication between said chambers, said piston having a ring element in one end of said passage for direct exposure to said high pressure chamber and defining a flow restricting opening for said passage, a pin element in said piston and disposed in said passage and having a free end centered in said ring element and facing said high pressure chamber, one of said elements being mounted for lengthwise shifting movement into said passage and said elements having cooperative surfaces providing an annular orifice therebetween having a configuration that progressively increases in size upon inward shifting movement of said one element and a load spring carried in said piston and projecting along said passage to act with predetermined initial force upon said one element and hold said one element towards said high pressure chamber to establish a minimum size orifice initially, with said load spring being yieldable to allow retraction of said one element into said passage and corresponding increase in the effective size of the orifice when pressure in the high pressure chamber increases beyond a predetermined value determined by the initial force of said spring and the effective transverse area of said one element, *said pressure regulating means being operable at pressures below approximately 4,000 p.s.i. to restrictively control the flow of fluid from the high pressure side of the piston to the other side thereof.*

19. In a hydraulic cushioning element having means providing a high pressure chamber, a low pressure chamber, wall structure separating said chambers, *said wall structure comprising a piston, pressure regulating means associated with the piston for controlling pressure within the high pressure chamber in response to movement of said piston toward cushion closure position, said pressure regulating means including* [and] *said piston* having a passage communicating *between said chambers* [therebetween] and having annular knife blade edge structure bordering and defining a portion of said passage that is exposed directly to said high pressure chamber, a shiftable metering pin disposed in said wall structure and having a free end intercepting said passage with said free end being smaller than and centered in clearance relation within said knife blade edge structure to continuously present maximum exposure area directly to pressure conditions in said high pressure chamber to define in cooperation with said edge structure an annular flow region having a symmetrical configuration that progressively increases in size upon shifting of said pin into said passage, and yieldable means mounted in said wall structure and biasing said pin towards an orifice narrowing position to allow retraction of said pin and increased openings of said orifice when pressure increases in said high pressure chamber, *said pressure regulating means being operable at pressures below approximately 4,000 p.s.i. to restrictively control the flow of fluid from the high pressure side of the piston to the other side thereof.*

20. In a hydraulic cushioning element having means providing a high pressure chamber, a low pressure chamber, wall structure separating said chambers, *said wall structure comprising a piston, pressure regulating means associated with the piston for controlling pressure within the high pressure chamber in response to movement of said piston toward cushion closure position, said pressure regulating means including* [and] *said piston* having a passage communicating *between said chambers* [therebetween], and a ring element mounted in said wall structure and bordering and defining a portion of said passage that is exposed directly to said high pressure chamber, a pin element disposed in said wall structure and having a free end intercepting said passage with said free end being smaller than and centered in clearance relation within said ring element for exposure directly to pressure conditions in said high pressure chamber, one of said elements being mounted for lengthwise shifting movement into said passage and said elements having cooperating annular surfaces providing an annular orifice therebetween, having a symmetrical configuration that progressively increases in size upon shifting of said one element into said passage, and yieldable means mounted in said wall structure and biasing said one element towards an orifice narrowing position in said passage to allow retraction of said one element and increased opening of said orifice when pressure increases in said high pressure chamber, *said pressure*

*regulating means being operable at pressures below approximately 4,000 p.s.i. to restrictively control the flow of fluid from the high pressure side of the piston to the other side thereof.*

21. An arrangement in accordance with claim 20 and wherein said pin element has an axial bore through said free end thereof and has a side bore adjacent said free end and connecting directly between said axial bore and said passage, a center pin disposed in lengthwise slidable relation in said axial bore and having a free end facing through said orifice and exposed directly to pressure conditions in said high pressure chamber, resiliently yieldable means in said axial bore and acting against said center pin with predetermined initial force to bias said center pin towards said high pressure chamber to a side bore masking position and enable retraction of said center pin and corresponding uncovering of said side bore prior to opening of said orifice.

References Cited

The following references, cited by the Examiner, are of record in the patented file of this patent or the original patent.

UNITED STATES PATENTS

| | | |
|---|---|---|
| 2,816,670 | 12/1957 | Edwards et al. |
| 2,914,195 | 11/1959 | Parnling. |
| 2,987,311 | 6/1961 | Schilling. |
| 2,994,442 | 8/1961 | Frederick. |
| 3,011,778 | 12/1961 | Ynterna. |

DRAYTON E. HOFFMAN, Primary Examiner

U.S. Cl. X.R.

213—8

PO-1050
(5/69)

UNITED STATES PATENT OFFICE
CERTIFICATE OF CORRECTION

Patent No. Reissue 27,159 Dated August 10, 1971

Inventor(s) David S. Campbell et al

It is certified that error appears in the above-identified patent and that said Letters Patent are hereby corrected as shown below:

Column 6, line 47, under second column of table for "19/64" read -- 13/64 --.

Column 11, line 52, after "and" insert -- said --.

Column 12, line 15, for "correspinding" read -- corresponding --; same column 12, line 23, for "fist" read -- first --.

Column 18, line 7, for "Parnling" read -- Pawling --; same column 18, line 8, for "Schilling" read -- Schilling et al --; same column 18, line 10, for "Yntema" read -- Yntema --.

Signed and sealed this 28th day of March 1972.

(SEAL)
Attest:

EDWARD M.FLETCHER, JR.
Attesting Officer

ROBERT GOTTSCHALK
Commissioner of Patents